United States Patent [19]

Katzenburger et al.

[11] Patent Number: 5,076,122
[45] Date of Patent: Dec. 31, 1991

[54] TUBE END FINISHING TOOL

[75] Inventors: Michael D. Katzenburger, Florissant; Wesley G. Wells, St. Louis, both of Mo.

[73] Assignee: McDonnell Douglas Corporation, Long Beach, Calif.

[21] Appl. No.: 632,730

[22] Filed: Dec. 24, 1990

[51] Int. Cl.5 .............................................. B23B 5/16
[52] U.S. Cl. ...................................... 82/113; 407/113; 408/211
[58] Field of Search .................. 82/113; 408/211, 227; 407/113

[56] References Cited

U.S. PATENT DOCUMENTS

| | | |
|---|---|---|
| 349,475 | 9/1886 | Barclay ............................ 407/113 X |
| 1,365,683 | 1/1921 | Griffith ............................ 407/113 X |
| 1,926,531 | 9/1933 | Graham ............................ 407/113 X |
| 3,365,773 | 1/1968 | Olsen . |
| 3,436,799 | 4/1969 | Kopy ............................ 407/113 X |
| 3,568,284 | 3/1971 | Lunden et al. .................. 407/113 X |
| 3,613,197 | 10/1971 | Stier ............................ 407/113 |
| 3,763,510 | 10/1973 | Graham ............................ 7/14.01 R |
| 3,821,836 | 7/1974 | Ohtsu ............................ 407/114 |
| 3,938,231 | 2/1976 | Hopkins ............................ 407/113 X |
| 3,999,452 | 12/1976 | Larsen ............................ 82/113 |
| 4,066,376 | 1/1978 | Eckle et al. .................. 407/101 |
| 4,130,371 | 12/1978 | Druxils ............................ 407/114 |
| 4,131,383 | 12/1978 | Powers ............................ 407/114 |
| 4,169,690 | 10/1979 | Kendra ............................ 407/90 |
| 4,188,162 | 2/1980 | Zweekly ............................ 407/114 X |
| 4,197,042 | 4/1980 | Krhounek et al. .................. 408/200 |
| 4,318,644 | 3/1982 | Seidel ............................ 407/114 |
| 4,320,996 | 3/1982 | Roos ............................ 407/113 X |
| 4,375,708 | 3/1983 | Hellnick et al. .................. 10/87 |
| 4,475,851 | 10/1984 | Hale ............................ 407/113 |
| 4,512,689 | 4/1985 | Bylund ............................ 407/113 X |
| 4,558,975 | 12/1985 | Hale ............................ 407/113 X |
| 4,575,888 | 3/1986 | Muren ............................ 407/113 X |
| 4,601,222 | 7/1986 | Gill ............................ 82/4 C |
| 4,607,988 | 8/1986 | Salm et al. .................. 407/113 |
| 4,669,925 | 6/1987 | Lowe et al. .................. 407/114 |
| 4,681,487 | 7/1987 | Pettersson ............................ 407/114 |
| 4,681,488 | 7/1987 | Markusson ............................ 407/114 |
| 4,692,070 | 9/1987 | Shikata ............................ 407/104 |
| 4,699,549 | 10/1987 | Shimomura et al. .................. 407/42 |
| 4,714,383 | 12/1987 | Shimomura et al. .................. 407/42 |
| 4,739,682 | 4/1988 | Birkestrand ............................ 82/113 |
| 4,755,085 | 7/1988 | Muren et al. .................. 407/113 |
| 4,770,571 | 9/1988 | Potemkin ............................ 408/188 |
| 4,799,834 | 1/1989 | Wells ............................ 408/200 |
| 4,819,526 | 4/1989 | Geise ............................ 82/113 |
| 4,889,454 | 12/1989 | Hillestad et al. .................. 408/211 |

Primary Examiner—Steven C. Bishop
Attorney, Agent, or Firm—Gregory A. Cone; John P. Scholl; James M. Skorich

[57] ABSTRACT

A cutting insert having four symmetrically located cutting edges is mounted on a cutting insert holder, which is in turn mounted on a rotary driver. One of the cutting edges projects out from the cutting insert holder. The rotary driver rotates the projecting cutting edge along a circular path. A tube end to be finished is held in contact with projecting cutting edge being co-linear with the centerline of the tube. A plurality of cutting insert holders each has a cutting insert mounted thereon with the respective projecting cutting edges being located at varying distances from the axis of rotation. The design of the cutting edges also varies. Tube ends having different radii, wall thicknesses, cross section, or chamfers are finished by successively mounting on the rotary driver the cutting insert holders having projecting cutting edges located the required distances from the axis of rotation and having the appropriate designs.

6 Claims, 2 Drawing Sheets

U.S. Patent
Dec. 31, 1991
5,076,122
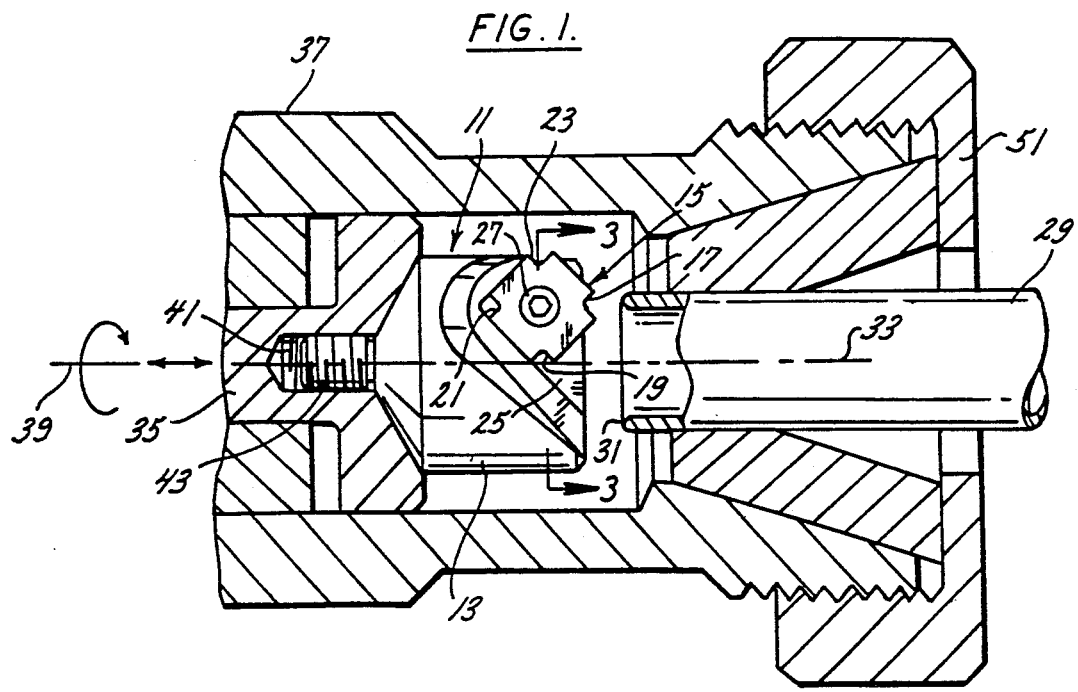
FIG. 1.
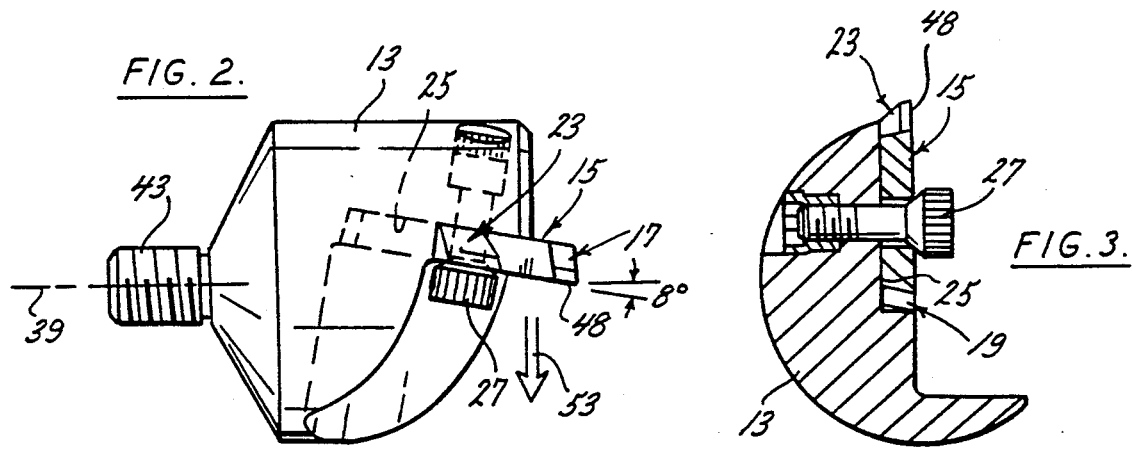
FIG. 2.
FIG. 3.
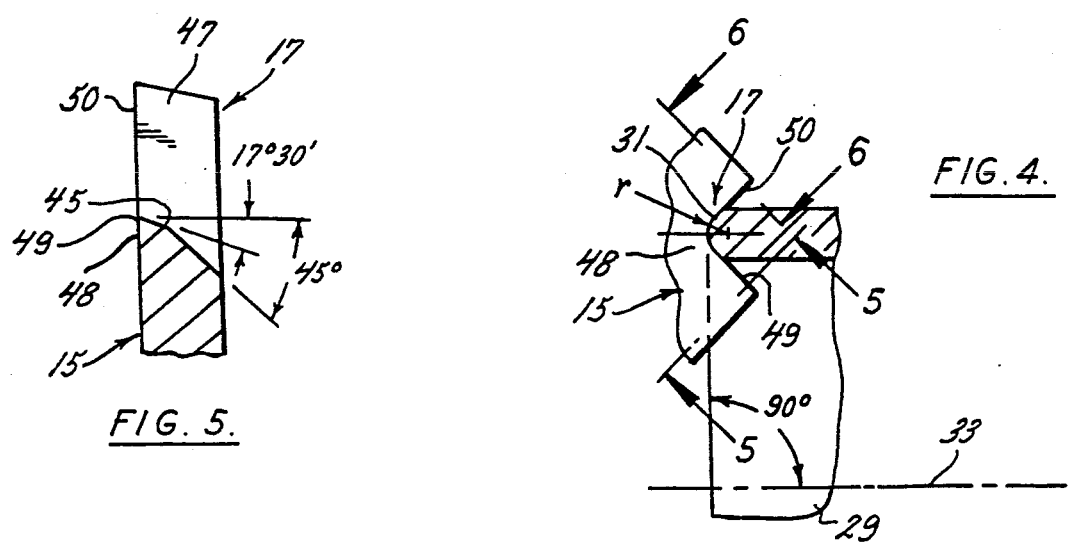
FIG. 5.
FIG. 4.

TUBE END FINISHING TOOL

BACKGROUND OF THE INVENTION

1. Field of the Invention

This invention relates to a tool for uniformly paring the end of a tube and, more particularly, for removing burrs from and otherwise finishing the tube end so that it has a uniform cross section.

2. Description of the Prior Art

In order to complete the manufacture of a wide variety of devices, it is commonly necessary to fasten the end of a tube to an annular fitting to provide for fluid communication between the tube and the fitting. Where the connection must be fluid tight, and especially where the fluid is under high pressure, the tube end must be finished so that it mates tightly with the annular fitting. Finishing the tube end removes burrs, pares the end so that it has a uniform cross section and, if desired, creates a chamfer.

The prior art for tube end finishing is comprised primarily of a tool having a cutting edge mounted on a rotary driver. The rotary driver rotates the cutting edge about an axis of rotation. The tube having an end to be finished is rigidly mounted so that its centerline lies colinear with the axis of rotation of the rotary driver and its end is in contact with the cutting edge. The position of the cutting edge on the rotary driver can be changed to vary the location of the cutting edge relative to the axis of rotation.

The tool operator manually positions the cutting edge based on the diameter, thickness and cross section of the tube end and, if called for, the desired chamfer. The operator adjusts the position of the cutting edge on successive trial runs until it appears to him that the cutting edge is in a position that will pare the tube end to the required specification. All tube ends having the same diameter, wall thickness, cross section and requiring the same chamfer are then finished.

The trial and adjustment process is repeated for the next tube or series of tubes having a different diameter, wall thickness, longitudinal cross section or requiring a different chamfer. The process must also be repeated when the cutting edge becomes dull and needs to be removed from the rotary driver to be sharpened or replaced.

The trial and adjustment process is time consuming and, as it must be repeated quite often, the tool operator easily spends more of his time attempting to obtain the proper positioning of the cutting edge relative to the rotary driver and tube end than he actually spends in paring the tube end. The sections of the tube used for trial runs must be scrapped. Further, whether each tube end meets the final chamfer and other finish specifications is determined solely by the personal judgment of the operator, and thus the finished tube ends cannot be guaranted to fall within design tolerances with any degree of certainty.

SUMMARY OF THE PRESENT INVENTION

Briefly, the present invention is comprised of a set of cutting inserts and insert holders. Each cutting insert has four symmetrically located cutting edges. Each cutting insert is mounted on an insert holder in a rigid nonadjustable position so that one of the cutting edges projects out from the insert holder.

An insert holder is removably mounted in a rigid nonadjustable position on a rotary driver. When the rotary driver is actuated, the projecting cutting edge rotates at a fixed radius about the axis of rotation of the rotary driver. A tube having an end to be finished is rigidly held with its centerline lying colinear with the axis of rotation of the rotary driver. To commence the end finishing process, the projecting cutting edge is brought into contact with the tube end. On actuation of the rotary driver, the projecting cutting edge will rotate in continuous contact with the tube end and pare it to remove burrs and obtain a uniform cross section having the desired chamfer or other finished configuration.

A set of insert holder and cutting insert combinations have the cutting inserts mounted, respectively, on the insert holders at different radii from the axis of rotation. The design of the cutting edge may also vary. Thus, when it is desired to finish the end of a tube having a thickness, radius or cross section different from that previously finished, or it is necessary to obtain a different chamfer, the operator need only remove the insert holder previously used from the rotary driver and insert the insert holder having cutting edges of the appropriate design and having its projecting cutting edge located at the necessary radius required to finish a tube end having a particular wall thickness, radius or cross section, or to obtain a specific chamfer.

No time consuming trial and adjustment iteration is required when there is a change in the wall thickness, radius, cross section or chamfer. The trial and adjustment procedure of the prior art required after changing a dull cutting edge is similarly avoided. There is no waste of tube sections as is the by-product of the trial and adjustment iteration. Further, the present invention eliminates the variance inherent to using human judgment to estimate whether the position of the cutting edge provides a finished tube end which meets the required specification.

BRIEF DESCRIPTION OF THE DRAWINGS

FIG. 1 is a side sectional view of a cutting insert mounted on a cutting insert holder, with the cutting insert being mounted on a rotary driver. Also shown opposite the cutting insert is a tube which is to have its end finished.

FIG. 2 is a top plan view of a cutting insert and cutting insert holder of the tube end finishing tool of the present invention.

FIG. 3 is a sectional view of cutting insert and cutting insert holder taken along 3—3 of FIG. 1.

FIG. 4 is an enlarged side view of a cutting edge notch of a cutting insert of the present invention. A tube end in contact with the cutting edge notch is also shown.

FIG. 5 is a view taken along line 5—5 of FIG. 4, and shows the two bevels of one cutting edge surface of a cutting edge notch of a cutting insert of the present invention.

DESCRIPTION OF A PREFERRED EMBODIMENT OF THE INVENTION

Figure 6:
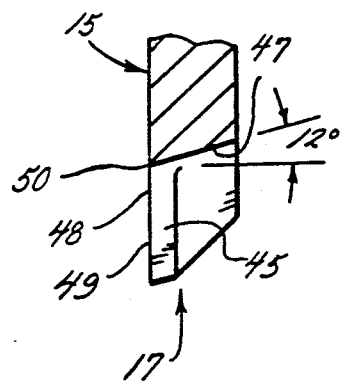
FIG. 6 is a view taken along line 6—6 of FIG. 4, and shows the bevel of the other cutting edge surface of a cutting edge notch of a cutting insert of the present invention.
Figure 7:
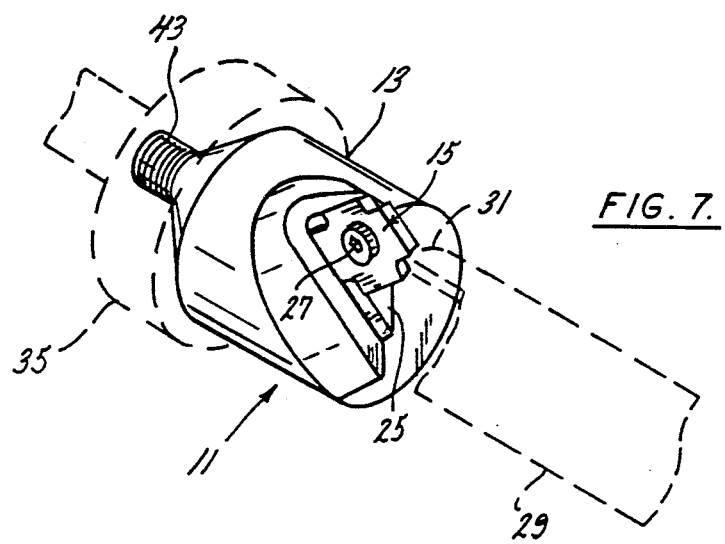
FIG. 7 is a perspective view of a cutting insert mounted on a cutting insert holder. The rotary driver and a tube which is to have its end finished are shown in phantom.
Figure 8:
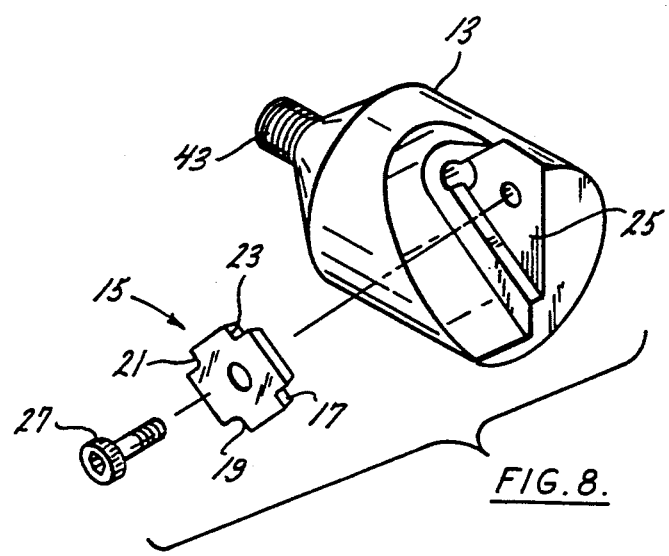
FIG. 8 is an explosion drawing showing how a cutting insert is removably attached to an insert holder by means of a screw.

Turning to the drawings, tube end finishing tool 11 includes insert holder 13 and cutting insert 15. Cutting insert 15 has four cutting edge notches, 17, 19, 21, and 23. Cutting insert 15 fits into cavity 25 in insert holder 13 and is removably attached thereto by means of screw 27. Cavity 25 is shaped so that cutting insert 15 is restrained from rotating about screw 27 after cutting insert 15 has been inserted and fastened into cavity 25.

FIG. 1 shows cutting insert 15 inserted into cavity 25 of insert holder 13 with cutting edge notch 17 projecting therefrom. Cutting insert 15 is symmetrically shaped so that it may be removed from cavity 25, rotated, and reinserted into cavity 25 with any of the other three cutting edge notches, 19, 21, or 23 projecting out from the edge of insert holder 13. The projecting cutting edge notch will be the notch used in the finishing operation with the remaining notches being spares for use should the projecting edge break or become dull. Also shown is tube 29 having tube end 31 and centerline 33. Tube end 31 is to be finished by cutting edge notch 17.

Rotary driver 35 is located in housing 37, is rotatable about axis of rotation 39, and can be axially moved within housing 37 along axis of rotation 39. Rotary driver 35 is powered by a motor (not shown) which forces it to rotate about axis of rotation 39. Threaded bore 41 is located in rotary driver 35. Insert holder 13 has threaded post 43 projecting therefrom which screws into bore 41 and thus provides for the removable attachment of insert holder 13 to rotary driver 35.

As indicated in FIG. 1, rotary driver 35 rotates cutting edge notch 17 counterclockwise from the perspective of tube end 31. Alternatively stated, rotary driver 35 will rotate cutting edge notch 17 out of the plane of the drawing and towards the viewer.

As best shown by FIGS. 4, 5 and 6, cutting edge notch 17 is comprised of surfaces 45 and 47, corner radius r, rake face 48 and cutting edges 49 and 50. Surface 45 and corner radius r have a relief angle of 17° 30' with a tolerance of +2° and a clearance angle of 45° with a tolerance of +5°. Surface 47 is adjacent to surface 45 and has a relief angle of 12° with a tolerance of +2°. Cutting edges 49 and 50 are adjacent to one another. As shown in FIG. 2, rake face 48 is positioned at a rake angle of 8° with a tolerance of ±1° with respect to axis of rotation 39. The surfaces, rake face, corner radius r and cutting edges for cutting edge notches 19, 21 and 23 are identical to illustrated surfaces 45 and 47, corner radius r, rake face 48, and cutting edges 49 and 50 for cutting edge notch 17.

It should be noted that the relief angles for surfaces 45 and 47, the clearance angle for surface 45, the rake angle for rake face 48, the corner radius r, and the angle between cutting edges 49 and 50 may be changed to suit a particular application of the present invention. The angles are provided solely as examples used in the prior art for the routine finishing of tube ends and it should not be implied that the use of the present invention is limited to cutting edge notches having such angles.

Vise 51 rigidly holds tube 29 so that tube centerline 33 is colinear with axis of rotation 39. Vise 51 is threadably engaged with housing 37.

To begin the finishing process, tube end 31 is brought into contact with cutting edge notch 17 by axially sliding rotary driver 35 relative to housing 37. Actuation of rotary driver 35 forces cutting edge notch 17 to move circularly in sliding contact with tube end 31. The direction of travel of rake face 48 is shown in FIG. 2 by arrow 53. It can thus be observed that rake face 48 leads cutting edges 49 and 50 over tube end 31 to pare it to a smooth finish.

Tube end finishing tool 11 includes a number of insert holders and respectively attached cutting inserts having projecting cutting edge notches at different radial distances from axis of rotation 39; having cutting edges located at varying angles between each other; having varying relief, clearance and rake angles; and having varying corner radii. Tube ends of different radii, wall thicknesses, cross sections and chamfers may be finished by successively inserting into rotary driver 35 the insert holders having projecting cutting edge notches of suitable design located at the appropriate radial distances.

The use of tube end finishing tool 11 to finish tube end 31 having a wall with a symmetrical cross section is by way of example only, and intended to provide means for understanding the operation and utility of the present invention. The present invention may be used with equal facility and utility to finish asymmetrical tube ends or ends on which it is desired to obtain a chamfer.

Changes and modifications in the specifically described embodiment can be carried out without departing from the scope of the invention which is intended to be limited only by the scope of the appended claims.

What is claimed is:

1. A tube end finisher comprising:
   a cutting insert having a plurality of cutting edges;
   each of said cutting edges including a rounded corner;
   an insert holder having a cavity for mounting said cutting insert therein; and
   said cavity having a shape that causes one of said cutting edges to project from said insert holder in a position to pare an end of a tube when said cutting insert is mounted therein and, further, that allows any one of said cutting edges to be alternatively placed in said paring position.

2. The tube end finisher recited in claim 1 wherein:
   each of said cutting edges includes two sections that are contiguous with and separated by said corner; and
   one of said sections being oriented for paring the outer diameter of said tube end and the other of said sections being oriented for paring the inner diameter of said tube end, when said cutting edge is mounted in said paring position.

3. The tube end finisher recited in claim 2 further comprising:
   a vise for gripping the outer diameter of said tube, whereby said tube is held stationary;
   means for rotating said insert holder with respect to said tube, whereby said cutting edge is rotated at a fixed radius about an axis of rotation when mounted in said paring position; and
   means for axially translating said insert holder with respect to said tube so that said cutting edge mounted in said paring position can abut said tube end, whereby said tube end can be pared by rotation of said cutting edge mounted in said paring position about said axis of rotation by said rotation means.

4. The tube end finisher recited in claim 3 further comprising:
   a housing;

said insert holder being located within said housing when it is mounted on said rotation means; and said vise being threadably attached to said housing.

5. The tube end finisher recited in claim 4 further comprising:
a set comprised of a plurality of said insert holders; wherein
at least two of said insert holders have said cavity located at different positions for providing different radii for said cutting edges respectively mounted in said paring positions in said cavities, whereby said set can pare a plurality of said tube ends having different diameters.

6. The tube end finisher recited in claim 5 wherein:
said rotation means has a threaded bore; and
each of said insert holders comprising said set has a threaded post which can be threadably inserted into said bore, whereby each of said insert holders of said set is interchangeably mountable on said rotation means.

* * * * *